(12) United States Patent
Latham et al.

(10) Patent No.: US 10,806,138 B1
(45) Date of Patent: Oct. 20, 2020

(54) ATV UNIVERSAL COUPLING

(71) Applicants: Phillip R. C. Latham, Pinson, TN (US); Michael Clark, Pinson, TN (US)

(72) Inventors: Phillip R. C. Latham, Pinson, TN (US); Michael Clark, Pinson, TN (US)

( * ) Notice: Subject to any disclaimer, the term of this patent is extended or adjusted under 35 U.S.C. 154(b) by 0 days.

(21) Appl. No.: 16/863,004

(22) Filed: Apr. 30, 2020

Related U.S. Application Data (60) Division of application No. 16/783,239, filed on Feb. 6, 2020, now Pat. No. 10,743,532, which is a continuation-in-part of application No. 16/520,859, filed on Jul. 24, 2019, now Pat. No. 10,597,005.

(60) Provisional application No. 62/828,097, filed on Apr. 2, 2019.

(51) Int. Cl.
*A22B 5/16* (2006.01)
*A01M 31/00* (2006.01)
*B60P 3/04* (2006.01)
*A22C 15/00* (2006.01)

(52) U.S. Cl.
CPC ............. *A01M 31/006* (2013.01); *A22B 5/16* (2013.01); *A22C 15/005* (2013.01); *B60P 3/04* (2013.01)

(58) Field of Classification Search
CPC ....... A01M 31/00; A01M 31/006; A22B 5/00; A22B 5/16
USPC .................. 452/185, 187–189, 198
See application file for complete search history.

(56) References Cited

U.S. PATENT DOCUMENTS

| | | | | |
|---|---|---|---|---|
| 6,220,382 B1* | 4/2001 | Kramer, Jr. | ............ | A61G 5/043 180/65.51 |
| 7,353,885 B2* | 4/2008 | Nordhoff | ............. | A01B 59/068 172/272 |
| 8,555,995 B2* | 10/2013 | Harris | .................. | A01B 59/064 172/439 |
| 8,727,360 B2* | 5/2014 | Catford | .................... | B60G 5/00 280/43.18 |
| 9,340,087 B2* | 5/2016 | Atkinson | ............. | B62D 33/023 |

* cited by examiner

*Primary Examiner* — Richard T Price, Jr.
(74) *Attorney, Agent, or Firm* — Chambliss, Bahner & Stophel, P.C.; Stephen D. Adams (57) ABSTRACT

A coupling apparatus for connecting an accessory to a rear of an ATV. The coupling apparatus includes a first support member configured to connect to the rear of the ATV, a second support member configured to connect to the accessory, and a coupling member configured to connect the first support member to the second support member. Finally, a shock is connected between the coupling member and the second support member.

15 Claims, 7 Drawing Sheets

ATV UNIVERSAL COUPLING

CROSS-REFERENCE TO RELATED APPLICATIONS

This application is a divisional of application Ser. No. 16/783,239, filed on Feb. 6, 2020 and entitled GAME ANIMAL PROCESSING APPARATUS, which is a continuation-in-part of application Ser. No. 16/520,859, filed on Jul. 24, 2019, now U.S. Pat. No. 10,597,005, which claims the benefit of U.S. Provisional Application No. 62/828,097, filed on Apr. 2, 2019, both entitled ANTI-TIPPING DEVICE FOR ATV; wherein the entire contents of the foregoing applications are hereby incorporated by reference in their entireties.

FIELD

The invention relates generally to accessories for all-terrain vehicles (ATVs) and the like. More particularly, the present invention relates to a universal coupling and a game animal processing apparatus configured for attachment to a receiver hitch of an ATV.

BACKGROUND

All-terrain vehicles (ATVs) are a popular type of vehicle used for leisure and non-leisure activities. ATVs are often ridden in and around areas that would be inaccessible by vehicle or would be difficult to traverse by foot. For example, they are often used in remote or isolated areas, such as desert and mountain areas. They are often used outdoors for riding trails, hunting and carrying game, transporting riders to and from job sites, etc.

ATVs are often used on terrain that is not always smooth and flat. They are frequently used to travel of rocky terrain, over brush, up-and-down crevices in trails, etc. Using an ATV in these areas can be hazardous to the riders due to the size and weight of the ATV, the young age or inexperience of the rider, etc.

ATVs are powerful but are still lightweight when compared to a road vehicle. On one hand, this combination allows the ATV to travel through terrain that would normally be inaccessible to a road vehicle. On the other hand, under certain conditions, the power of the ATV combined with its lightweight can sometimes cause the front end of the ATV to be raised off of the ground and, in some cases, to tip backwards. Tipping might occur, for example, if the ATV is used in climbing a hill that is too steep or if the rear of the vehicle is overloaded. This creates a very dangerous and potentially deadly scenario, especially for the young or elderly rider and for riders located in remote locations or inaccessible terrain.

When an experienced single rider drives an ATV, they can reduce the likelihood of the ATV tipping by shifting their body weight forward to aid in the maneuvering on difficult terrain and rebalancing the vehicle. However, this weight shifting technique may not be possible for inexperienced riders or where more than rider is on the ATV, especially when two riders are using an ATV intended for only a single rider. It also may not be sufficient to prevent the ATV from tipping when a sufficiently heavy enough load is placed onto the rear of the vehicle, such as when hauling large game or other heavy loads on the rear of the ATV.

Another issue that is commonly faced by ATV enthusiasts, including particularly those who are also hunters, is the need to field dress and skin a game animal in the field. Field dressing is the process of removing internal organs from a game animal, which is a necessary step to preserve the meat from harvested animals. Additionally, skinning the animal is typically much easier within the first several hours after harvesting, while it is still warm. For this reason, the field dressing and skinning process often begins in the field.

What is needed, therefore, is an apparatus that will facilitate field dressing and skinning game animals in remote locations.

NOTES ON CONSTRUCTION

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected", "mounted" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

The term "ATV" means all-terrain vehicles and includes quads, three- and four-wheelers, and the like. The term ATV is also used herein to refer to other lightweight utility, recreational, and other multi-purpose vehicles as well as bikes, scooters, motorcycles, etc. that are susceptible to tipping rearwards about a rear wheel or wheelset. The term "caster" means any appropriate rolling apparatus, including casters, rollers, tires, etc. for traversing over a ground surface by rolling.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

SUMMARY

The above and other needs are met by a game animal processing apparatus configured to operate in a hanging mode of operation for hanging a game animal above a ground surface and a skinning mode for skinning the game animal while the game animal is hung above the ground surface. The apparatus includes a hoist having a horizontal arm and a cable that may be raised and lowered. A first hook is located on the cable such that pulling the cable, when in the hanging mode of operation, causes the hook to be raised vertically towards the horizontal arm. A second hook is located on the horizontal arm of the hoist. A game hanger includes a first hook connection that connects to the first hook such that pulling the cable vertically raises the game hanger towards the horizontal arm. A second hook connection connects to the second hook in order to hang the game hanger from the horizontal arm of the hoist. Lastly, the game hanger includes a pair of prongs that are each configured to support a portion of the game animal. The weight of the game animal may be entirely supported by the prongs when the game hanger is hung from the hoist via the second hook and second hook connection.

Also disclosed is a coupling apparatus for connecting an accessory to a rear of an ATV. In certain embodiments, the coupling apparatus includes first support member configured to connect to the rear of the ATV, a second support member configured to connect to the accessory, and a coupling member configured to connect the first support member to the second support member. Finally, a shock is connected between the coupling member and the second support member. In certain preferred embodiments, the first support member is pivotally connected to the coupling member and is configured to rotate about a first axis with respect to the coupling member. The coupling member may include a tube section having a leading end configured to connect to the first support member and a trailing end configured to connect to the second support member. Preferably, a shock support arm extends upwards from the tube section and connects the shock between the shock support arm and the second support member. In certain embodiments, the coupling member and the shock are configured to connect to the second support member at different mounting locations. In certain embodiments, the first and second support members engage the coupling member along a common horizontal axis.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein.

DETAILED DESCRIPTION

Figure 1:
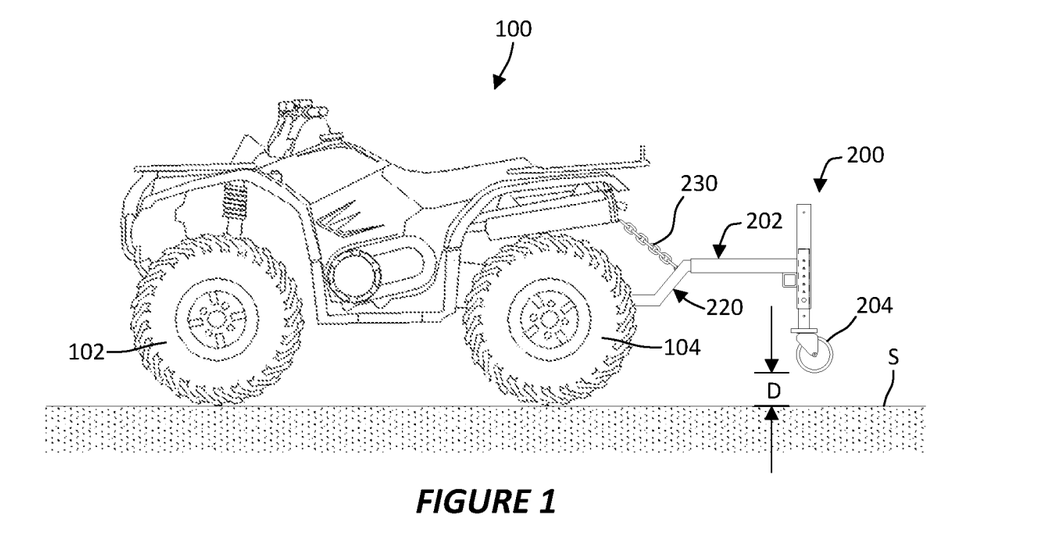
FIG. 1 is a side elevation view depicting an ATV equipped with an anti-tip device according to an embodiment of the present invention.
Figure 2:
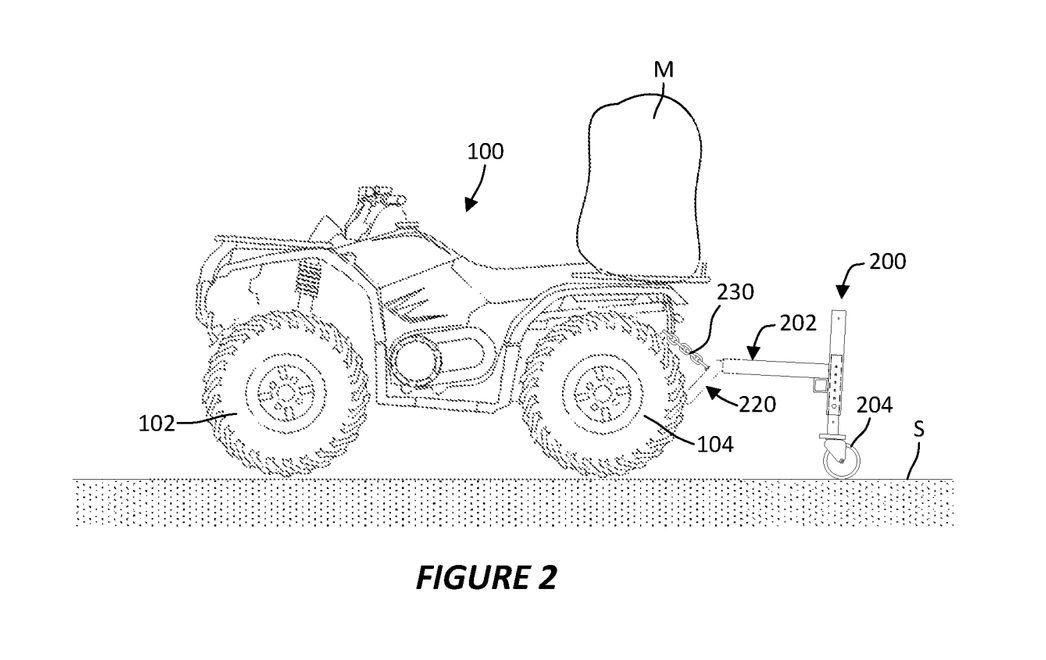
FIG. 2 depicts the ATV of FIG. 1 with a weight placed on a rear cargo rack that causes a wheel of the anti-tip device to be lowered and to contact a ground surface.

Referring now to FIGS. 1 and 2, there is provided ATV 100 having front wheels 102 and rear wheels 104, which, under most normal operating conditions, remain in contact with ground surface S. However, ATV 100 is sometimes placed under non-normal loading and terrain conditions, which might cause front wheels 102 of ATV 100 to rotate about rear wheels 104 (clockwise, as shown in FIG. 2). For example, placing a large enough mass M above and at least partially behind the center of rear wheel 104 might cause the ATV to tend to tilt backwards. Mass M could represent a person, large game, etc. that is loaded onto a cargo area of the ATV behind the driver. With continued overloading, front wheels 102 might eventually rise upwards away from ground surface S and rotate clockwise with respect to rear wheels 104, which might cause ATV 100 to tip over backwards. Rolling an ATV in this manner can be very dangerous and could seriously injure or kill the driver or passengers. However, in this case, ATV 100 is equipped with an anti-tip device 200 according to an embodiment of the present invention that prevents this type of rolling from occurring. Anti-tip device 200 includes first support member 202 to which casters 204 are operatively connected and that may be connected directly to the ATV 100. First support member 202 is constructed such that a bottom of each of casters 204 is spaced a distance D away from ground surface S under normal operating and loading conditions. However, as ATV 100 is overloaded and rotates upwards, casters 204 eventually contact ground surface S and further rotation is prevented or limited.

Figure 3:
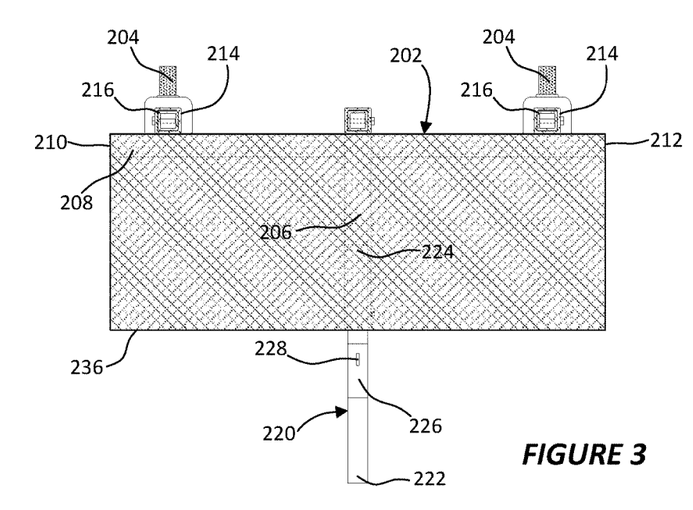
FIG. 3 is a top plan view illustrating an anti-tip device according to an embodiment of the present invention.
Figure 4:
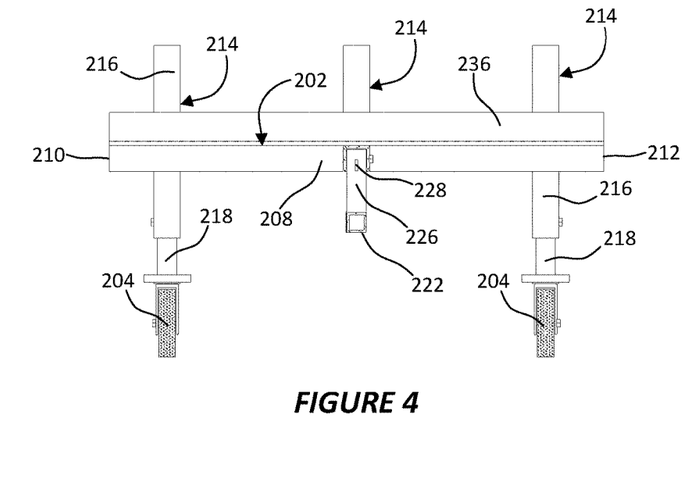
FIG. 4 is a front elevation view of the anti-tip device shown in FIG. 3.
Figure 5:
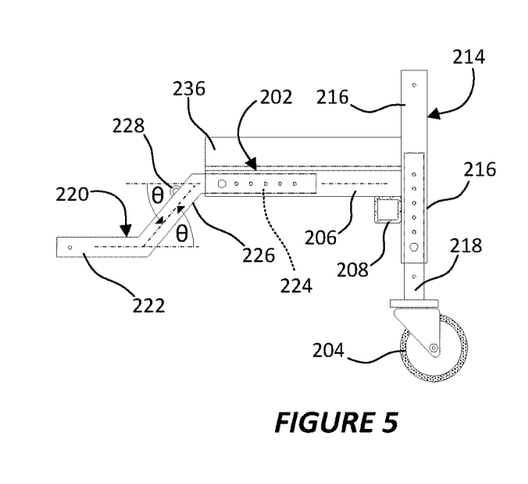
FIG. 5 is a side elevation view of the anti-tip device shown in FIG. 3.

As illustrated in FIGS. 3-5, according to preferred embodiments, first support member 202 includes first section 206 and second section 208. In this particular case, first section 206 is integrally-formed (i.e., as a single component) with second section 208. However, in other embodiments, first section 206 and second sections 208 are separate components, which could allow the first support member 202 to be made more compact. In this particular embodiment, first section 206 bisects the second section 208 at a right angle, such that first support member 202 is "T" shaped. Second section 208 includes left end 210 and right end 212. Cargo tray or rack 236 may be placed onto and removably connected to first support member 202 for carrying passengers or cargo. The first section 206 may be connected directly to the ATV 100 and the casters 104 may be connected to the second section 208

Vertical legs 214 are preferably connected proximate left end 210 and right end 212 of second section 208 of the first support member 202. In this embodiment, vertical legs 214 are nested tubes comprised of an outer portion 216 and an inner portion 218 that slides within the outer portion and that may be fixed at plurality of selected positions with respect to the outer portion in order to vary the length of the vertical leg 214. Caster 204 is preferably located at the bottom end of inner portions 218 of at least two vertical legs 214. Caster 204 may be raised and lowered by sliding inner portion 216 within outer portion 218 and then fixed at a desired vertical position by fixing inner portion 218 within outer portion 216. By raising and lowering caster 204, distance D separating the bottom of the caster and the ground surface S can be modified in order to allow for more or less rotation of the ATV 100 about the rear wheels.

In certain preferred embodiments, a second support member 220 connects the first support member 202 to the ATV 100. More specifically, second support member 220 is provided with leading end 222 that connects to ATV 100, trailing end 224 that connects to first support member 202, and transition section 226 that connects the leading end to the trailing end. Preferably, transition section 226 is angled such that trailing end 224 is positioned vertically above leading end 222 (as illustrated in FIG. 5) such that leading end of second support member 220 is vertically positioned between the vertical position of caster 204 and the vertical position of trailing end of connector. The angled transition section 226 raises casters 204 in order to provide distance D (shown in FIG. 1) between a bottom of the casters and ground surface S. In this particular case, the transition section 226 is sloped upwards at an angle θ that ranges from greater than 0° up to and including 90°. In the illustrated case, angle θ is approximately 30-50°. In the illustrated embodiment, the angle between the leading end axis and the transition section axis is equal to the angle between the trailing end axis and the transition section axis, such that the leading and trailing ends are parallel to one another. However, in other embodiments, the leading and trailing ends may not be parallel to one another.

Leading end 222 of second support member 220 is preferably configured to removably connect to a rear receiver hitch of ATV 100. In this particular embodiment, second support member 220 is formed using 1¼" square tubing and the leading end 222 is sized for insertion into a square opening of a receiver hitch, where it may be held securely by a pin connection or the like. Trailing end 224 of second support member 220 is preferably inserted into a leading open end of first section 206 of first support member 202. For example, in this particular embodiment, second support member 220 is formed using 1¼" square tubing and first support member 202 is formed using square tubing that is slightly larger so that the second support member 220 may be inserted into the leading end of the first section 206. Second support member 220 preferably slides forwards and backwards within first section 206 of first support member 202 to selectively position the anti-tip device 200 closer or further away from ATV 100, and may be held securely at the desired front-to-back position by a pin connection or the like.

Connection point 228, in the form of a ring, is located on the second support member 220, preferably on transition section 226. In preferred embodiments, chain 230 (shown in FIG. 1), which may include a turnbuckle, adjustable strap, cable, or other similar device, is connected between ATV 100 and connection point 228. This serves as a secondary point of connection between the ATV and the anti-tip device 200, in addition to leading end 222, for securing and stabilizing anti-tip device when it is in use.

Figure 6:
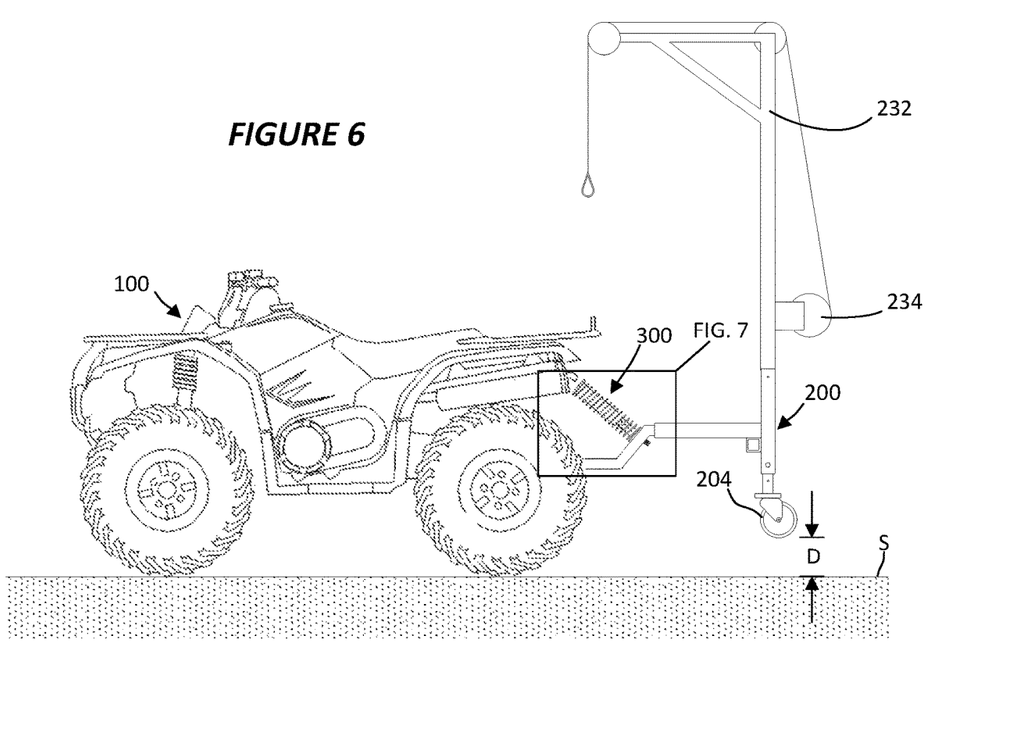
FIG. 6 is a side elevation view of an anti-tip device equipped with a game hoist and cargo rack.
Figure 7:
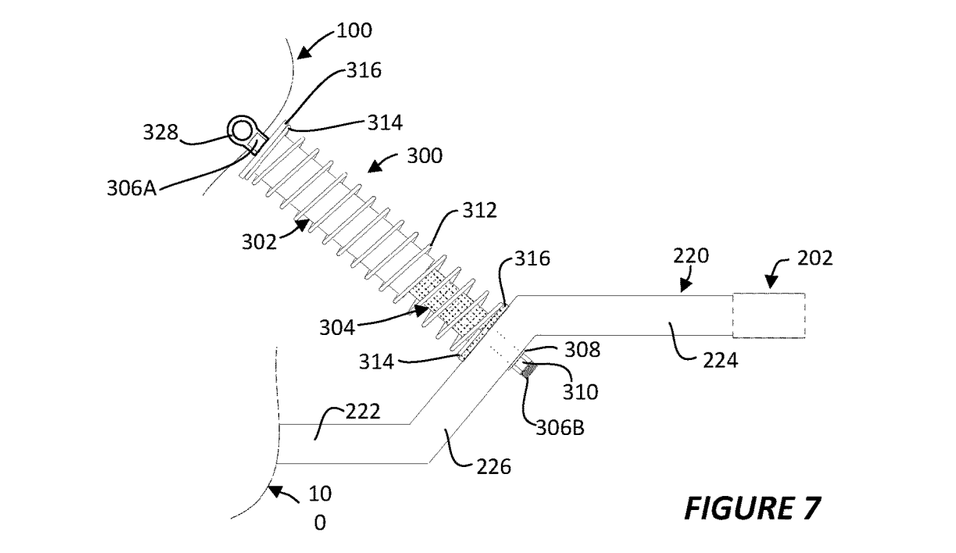
FIG. 7 is a detail view of a portion of the anti-tip device shown in FIG. 6 enclosed within the box labeled "FIG. 7"
Figure 8:
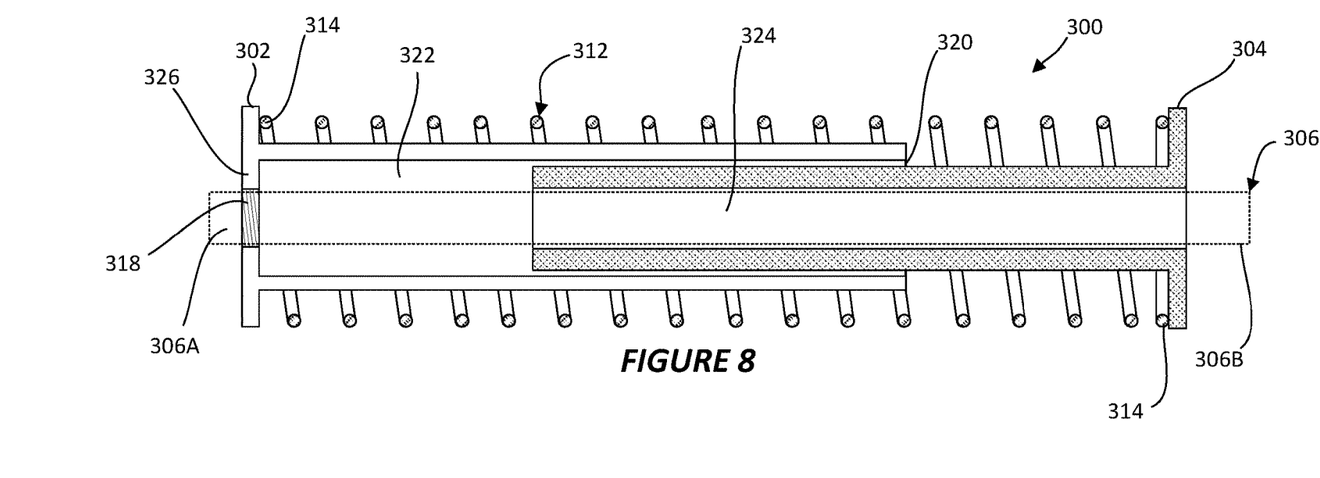
FIGS. 8 and 9 are cutaway views of the shock absorbing linkage of FIG. 9, shown in an extended and a compressed state, respectively.
Figure 9:
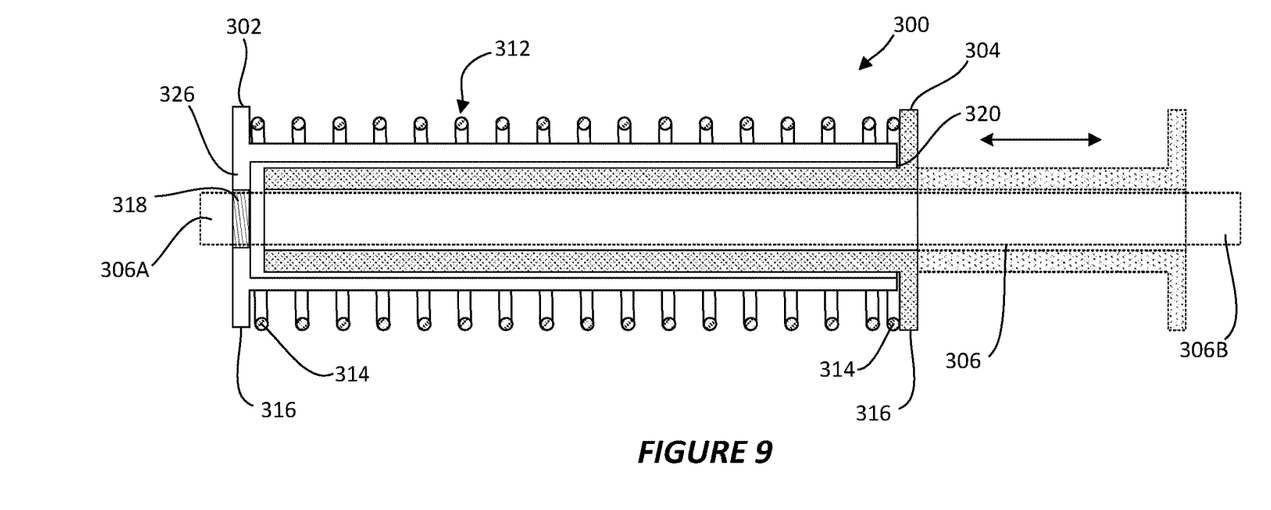

In certain preferred embodiments, chain 230 may be replaced with another linkage apparatus that, in addition to connecting anti-tip device 200 to ATV 100, absorbs shock and biases the anti-tip device in a desired direction. An example of one such shock-absorbing linkage 300 is depicted in FIGS. 6-9, which linkage connects a portion of anti-tip device 200 to ATV 100. Linkage 300 biases anti-tip device 200 downwards (clockwise, as shown in FIG. 6) such that caster 204 is located at a distance D above the ground surface S under normal operating conditions. Linkage 300 also compresses when upwards pressure is applied to second support member 220, such as when caster 204 contacts the ground surface S and prevents the ATV 100 from flipping over backwards. Through this compression, linkage 300 absorbs or dampens shocks to anti-tip device 200 as the anti-tip device is rotated upwards (counter-clockwise, as shown in FIG. 9).

Preferred embodiments of linkage 300 include outer piston tube 302 and inner piston 304. Inner piston 304 is inserted into the piston tube 304 via open end 320, and is configured to slide within hollow interior portion 322. Guide rod 306 extends through the linkage 300, including through a bore 324 formed through the inner piston 304, through the hollow interior portion 322, and out via a threaded opening 318 formed in a closed end 326 of the piston tube 302.

Guide rod 306 includes first threaded end 306A that is threaded into threaded opening 318 formed in end 326 of piston tube 302. As a result of this threaded engagement, guide rod 306 is held at a fixed lateral position with respect to the piston tube 302. Preferably, inner piston 304 slides freely along the guide rod 306 with minimal friction between an expanded position (FIG. 8) and a compressed position (FIG. 9). For that reason, either or both of the piston tube 302 and piston 304 may be formed using a low-friction material, such as high-density polyethylene (HDPE). Additionally or alternatively, a lubricant, grease, etc. may be located between piston tube 302 and piston 304 to facilitate reciprocation of the piston within the piston tube. Spring 312 extends along the length of linkage 300 and opposing ends 314 of the spring are configured to contact shoulders 316 formed at opposite ends of piston tube 302 and piston 304. In the expanded position, spring 314 is uncompressed or, more preferably, minimally compressed between shoulders 316. By sliding piston 304 further into piston tube 302 (i.e., towards the compressed position), spring 312 is compressed even more. A relief valve may be located in piston tube 302 or piston 304 to allow gas trapped within linkage 300 to escape at a selectable flow rate and for the piston to be pushed into the piston tube more or less easily, depending on that flow rate.

Linkage 300 is biased towards the extended position by spring 12 and internal gas pressure within linkage, where compression of the spring and gas pressure are at a minimum. In the extended position, movement of piston 304 with respect to guide rod 306 is preferably limited by a washer 308 and nut 310 threaded onto a threaded second end 306B of the guide rod.

Figure 10:
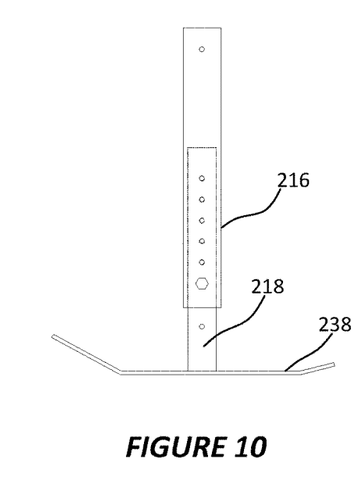
FIG. 10 is a side elevation view depicting a ski that may be used to replace casters shown in FIG. 5 in snowy or icy conditions.

In the illustrated embodiment, vertical leg 214 extends upwards and includes an open top that is configured to receive tubes and the like in order to connect accessories to the rear of the device 200. For example, a game hoist 232 and winch 234 may be removably connected to the device 200 via one of the vertical legs 214. Additionally, as shown in FIG. 10, ski 238 may replace casters at the bottom of vertical legs 214 for use in snowy or icy conditions.

In use, the linkage 300 is preferably connected between the ATV 100 and the transition section 226 of the second support member 220. In the illustrated embodiment, threaded first end 306A of guide rod 306 is connected to a corresponding threaded connector 328 located on ATV 100 and threaded second end 306B of guide rod is preferably inserted through transition section 226 and is fixed in place using washer 308 and nut 310. Inserting second end 306B of guide rod 306 through transition section 226 requires spring 312 to be compressed slightly between contact shoulders 316 of piston tube 302 and piston 304. This slight compression ensures that a slight expanding pressure is applied to transition section 226 and ATV 100 by the linkage 300, which pressure tends to bias the second support member 220 downwards (clockwise, as shown in FIG. 6).

Piston 304 slides freely within piston tube 302 between an expanded position, where the spring is uncompressed or minimally compressed, and a compressed position, where the spring is more compressed. As ATV 100 is overloaded or travels over rough terrain or up steep grades and caster 204 contacts ground surface S, as depicted in FIG. 2, anti-tip device 200 will rotate counter-clockwise as upwards pressure of the ground surface is applied to the device. This counter-clockwise movement of anti-tip device 200 compresses spring 312 and moves linkage 300 towards the expanded position. Once the upwards pressure is removed (e.g., the ATV is not located on a steep grade and the caster 204 is no longer in contact with the ground surface S), the spring force automatically biases second support member 220 in a clockwise direction and piston 304 moves automatically back to the extended position as the spring force is released.

Figure 11:
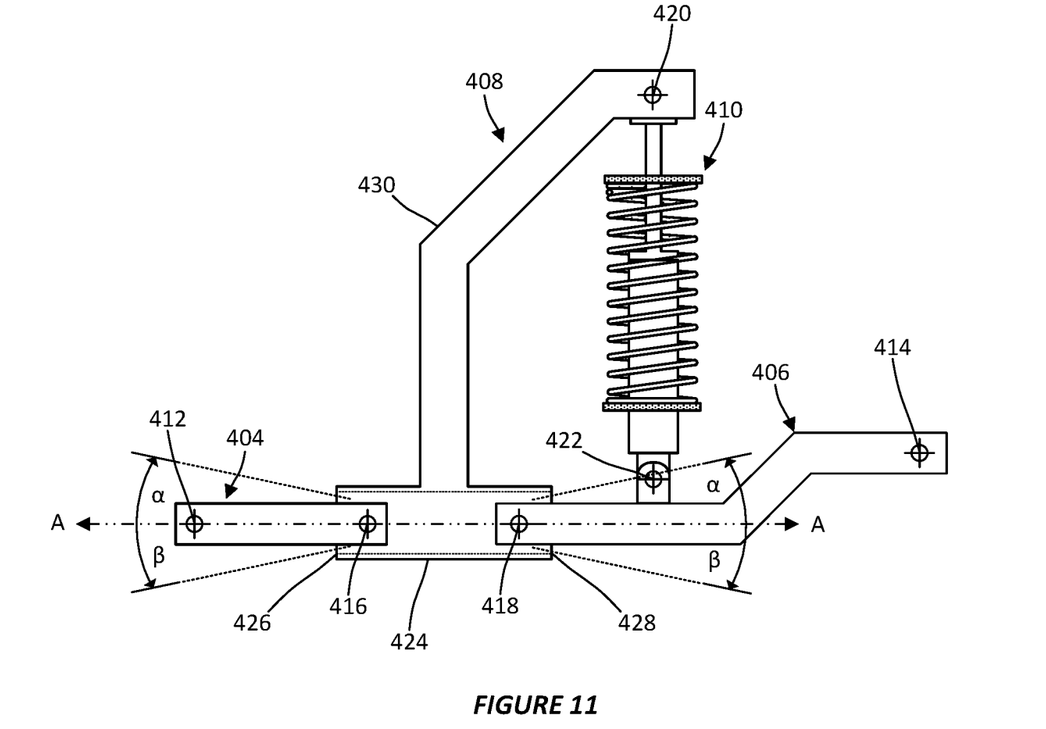
FIG. 11 is a side elevation view of a coupling apparatus according to an embodiment of the present invention.
Figure 12:
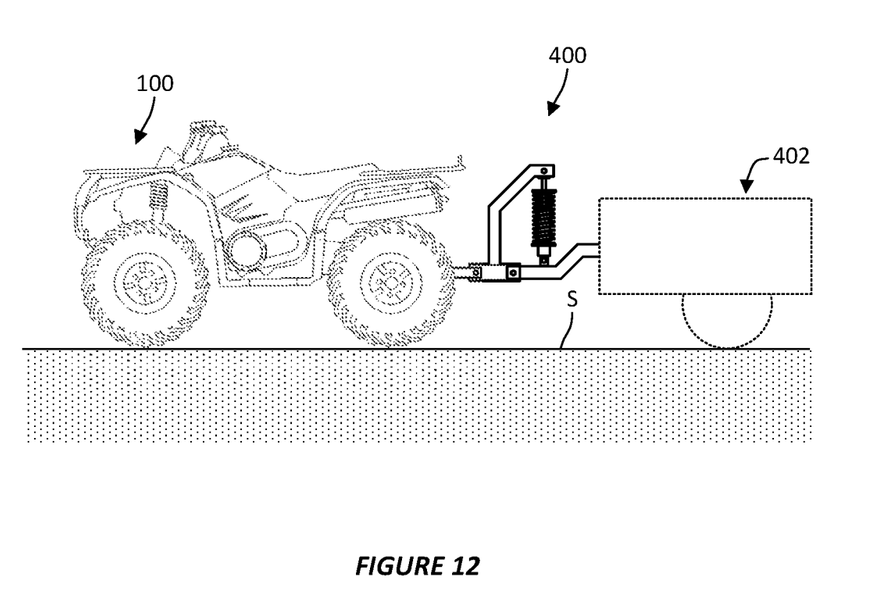
FIG. 12 depicts the coupling apparatus of FIG. 11 in use to connect an ATV to an accessory trailing the ATV.

With reference now to FIGS. 11 and 12, there is provided a coupling apparatus 400 for connecting an accessory 402, such as a trailer or anti-tip device 200 (FIG. 1), to a rear of an ATV 100 according to an embodiment of the present invention. More particularly, the coupling apparatus 400 includes a first support member 404, which is configured to connect to the rear of the ATV 100 and a second support member 406 (a modified version of second support member 220, shown in FIG. 1) configured to connect to the accessory 402. A coupling member 408 connects the first support member 404 to the second support member 406. Preferably, the first and second support members 404, 406 engage the coupling member 408 along a common horizontal axis A. Lastly, a shock 410 is connected between the coupling member 408 and the second support member 406. This apparatus 400 is particularly useful for providing shock absorption between an ATV 100 and an accessory 402, where the ATV lacks suitable mounting locations for mounting conventional shocks, etc. Instead, apparatus 400 may be mounted to a convention hitch mount found on most ATVs.

The first support member 404 connects to the rear of the ATV 100 at a first mounting location 412 and the second support member connects to the accessory 402 at a second mounting location 414. Further, the coupling member 408 connects to the first support member 404 at a third mounting location 416 and to the second support member 406 at a fourth mounting location 418. Lastly, the shock 410 connects to the coupling member 408 at a fifth mounting location 420 and to the second support member 406 at a sixth mounting location 422. In the illustrated embodiment, the coupling member 408 includes a tube section 424 having a leading end 426 that is configured to connect to the first support member 404 and a trailing end 428 that is configured to connect to the second support member 406. Additionally, coupling member 408 includes a shock support arm 430 extending upwards from the tube section 424, and shock 410 is configured to connect between the shock support arm and the second support member.

Any of the above-described connections (i.e., at mounting locations 412, 412, 414, 416, 418, 420) may be made via a pin or other fixed connection means. However, preferably, the first and second support members 404, 406 may be pivotally connected to the coupling member 408 and are configured to rotate vertically about an axis (extending out of the page at mounting location 416 or 418, respectively) in either an upwards direction (represented by angle α) or a downwards direction (represented by angle β) with respect to the coupling member. In the illustrated embodiment, this rotation may be up to 15° in either vertical direction. However, greater or lesser degrees of rotation are possible. Additionally, the degree of upward rotation permitted (angle α) may be different from the degree of downward rotation permitted (angle β). In certain embodiments, first support member 404 is fixedly mounted to coupling member 408 at mounting location 416 such that there is no rotation, and rotation is permitted at mounting location 418 between coupling member and second support member 406.

Shock 410 is preferably rigidly coupled to coupling member 408 at mounting location 420. As coupling member 408 pivots with respect to first support member 404 about mounting location 416 or with respect to second support member 406 about mounting location 418, or both, shock 410 compresses. This allows for the absorption of shock (i.e., motion) between the ATV 100 and the accessory 402 following the ATV. As such, coupling apparatus 400 provides significant flexibility when mounting and using an accessory 402 with an ATV 100.

Now, with reference to FIGS. 13-17, there is provided an ATV-towable game animal processing apparatus 500 according to an embodiment of the present invention. Apparatus 500 is configured to operate in a hanging mode of operation (FIG. 13) for hanging a game animal above a ground surface and a skinning mode of operation (FIG. 14) for skinning the game animal while it is hung above the ground surface.

Figure 13:
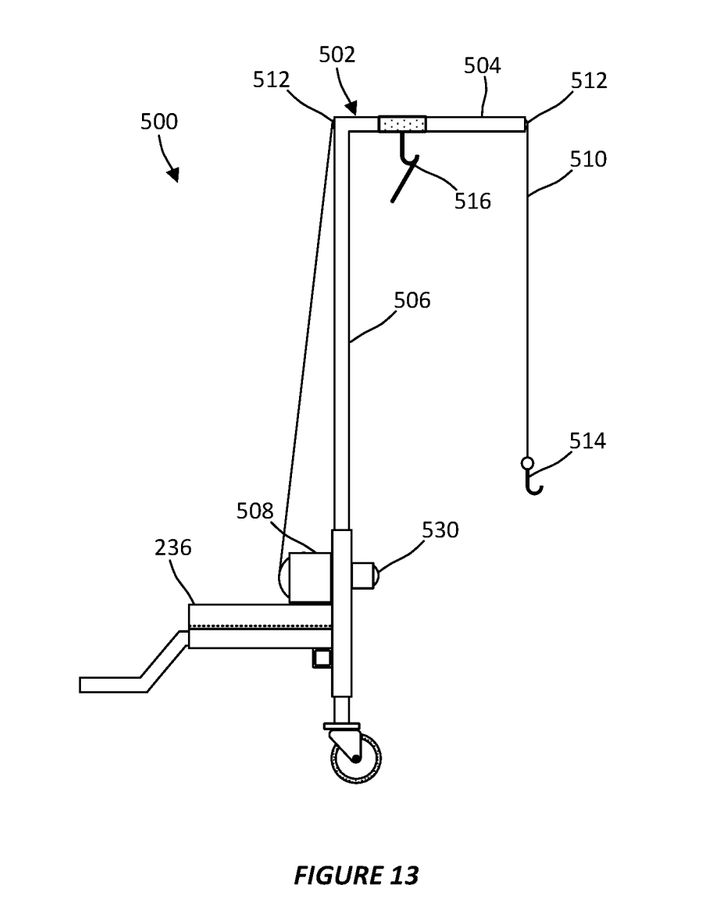
FIGS. 13 and 14 are side elevation views depicting a game animal processing apparatus in a hanging mode of operation and a skinning mode of operation according to an embodiment of the present invention.
Figure 14:
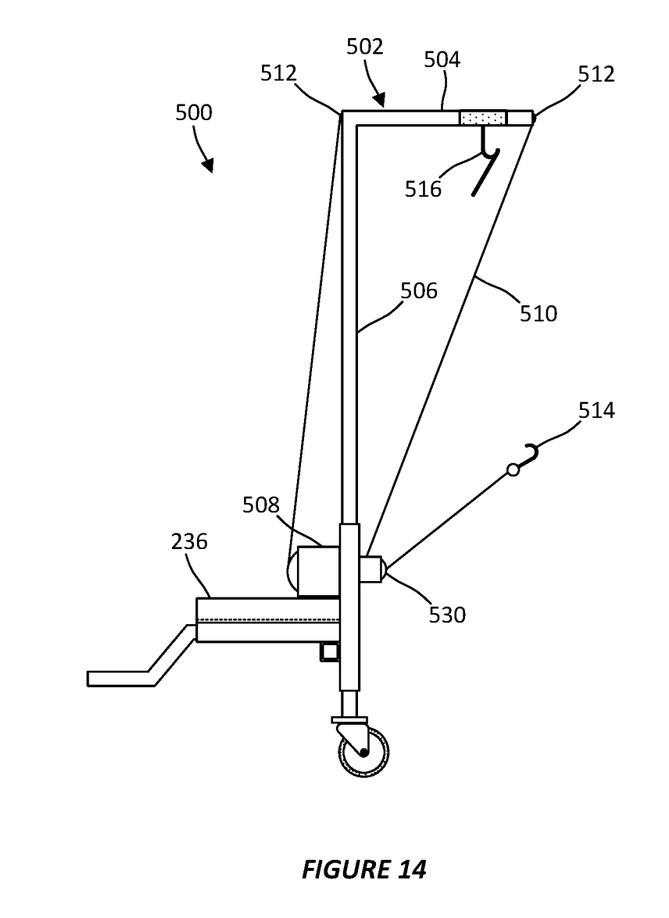

The apparatus 500 includes a hoist 502 (a modified version of hoist 232, shown in FIG. 6) having a horizontal arm 504 and a vertical arm 506 mounted to and positioned vertically below the horizontal arm. The vertical arm 506 may be connected, for example, to an ATV 100 via an anti-tip device 200, as shown in FIG. 6. In preferred embodiments, the vertical arm 506 is rotatable about a vertical axis passing vertically through the vertical arm, such that the horizontal arm 504 may be rotated between a forward-facing orientation and a rearward-facing orientation. This would allow, for example, a game animal placed on cargo rack 236 to be raised prior to being rotated rearwards and skinned.

Preferably, a winch 508 is attached to the hoist 502. A cable 510 of the winch 508 extends around rollers 512 located on the hoist 502 such that a portion of the cable is suspended from the horizontal arm 504 and may be raised and lowered. A first hook 514 is located on the cable (in this case, at the end of the cable). When the apparatus 500 is operating in the hanging mode of operation, pulling the cable 510 causes the first hook 514 to be raised vertically towards the horizontal arm 504. A second hook 516 is located on the horizontal arm 504 of the hoist 502. Preferably, the second hook 516 can slide laterally along the length of the horizontal arm 504. This would, for example, facilitate either storage of the game animal on cargo rack 236 (when the second hook 516 is located near vertical arm 506) or access during the skinning process (when the second hook is remote from vertical arm).

The apparatus 500 includes a game hanger 518 (FIG. 15), which is preferably formed as a single, unitary component. The game hanger 518 includes a first hook connection 520 that connects to the first hook 514. Pulling the cable 510 in the hanging mode of operation vertically raises the game hanger 518, via the connection between the first hook 514 and first hook connection 520, towards the horizontal arm 504. Game hanger 518 also includes a pair of prongs 524 that are each configured to engage (e.g., to be inserted through) and support a portion 526 of the game animal (e.g., hind legs) such that the entire weight of the game animal may be supported by the prongs when the game hanger 512 is hung from the first hook 514 via the first hook connection 520.

Figure 15:
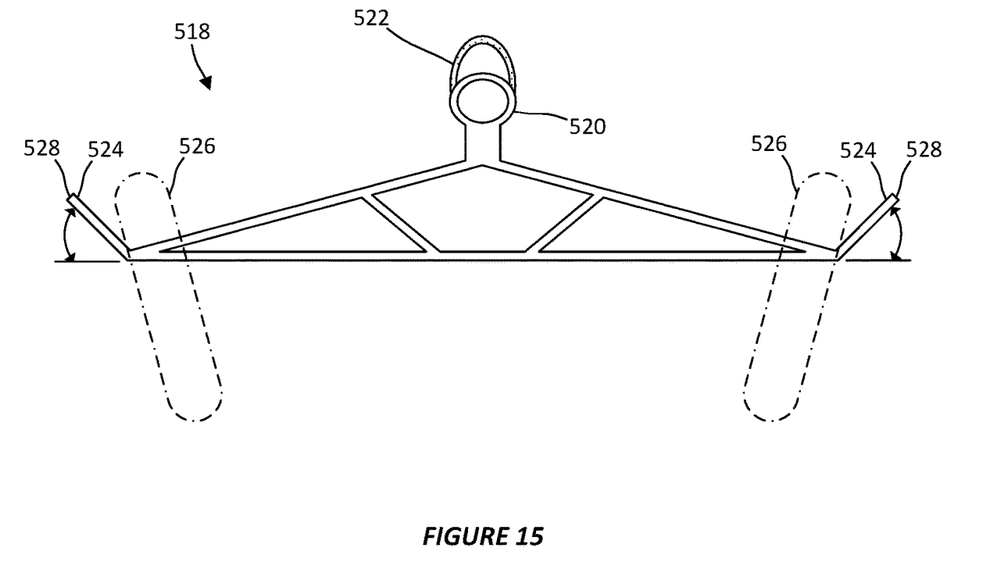
FIG. 15 is a front view depicting a game hanger according to an embodiment of the present invention.
Figure 16:
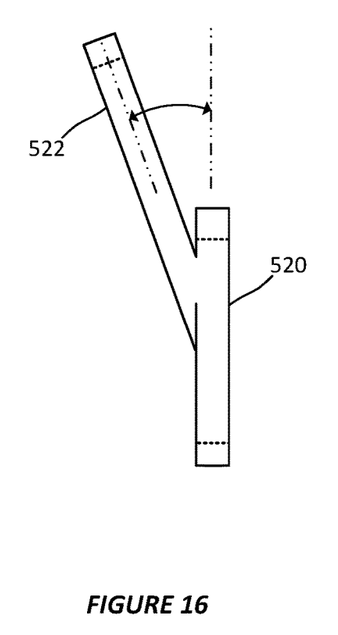
FIG. 16 is a side elevation depicting a double hook connection portion of the game hanger of FIG. 15.
Figure 17:
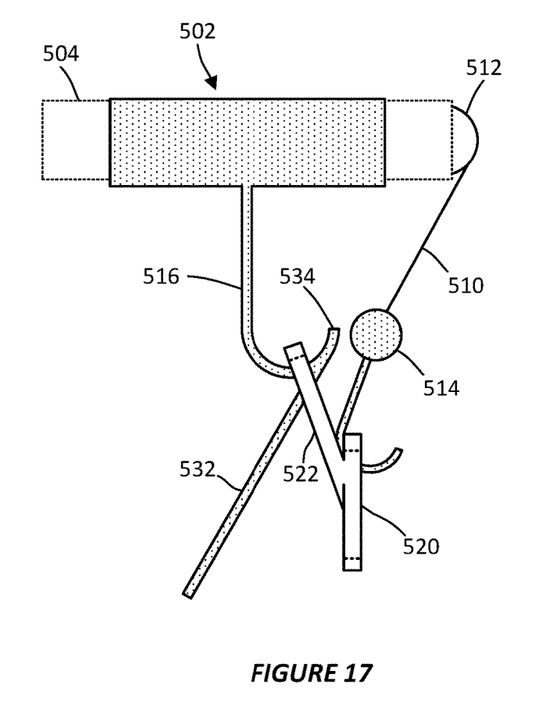
FIG. 17 is a side elevation view depicting the double hook connection of FIG. 16 simultaneously connected to a first and second hook of the apparatus of FIG. 13.

Preferably, ends 528 of each of the prongs 524 are rotated vertically towards one another (leftwards or rightwards, as seen in FIG. 15). In certain embodiments, the ends 528 of the prongs 524 are rotated approximately 15° to approximately 60° with respect to a horizontal axis extending laterally along the game hanger 518. Angling the prongs 524 in this matter ensures that the game animal does not slip from the game hanger 518. In certain embodiments, the prongs 524 are disposed at opposing left and right sides of the game hanger 518 such that a center of gravity of the game animal is located between the prongs. Additionally, in preferred embodiments, the first hook connection 520 and the second hook connection 522 are each disposed at approximately a center point between the opposing left and right sides of the game hanger 518, which ensures that the game animal hangs vertically from the cable 510 and hoist 502.

After the game animal has been raised to the horizontal arm 504, a second hook connection 522 connects to the second hook 516 located on the horizontal arm in order to hang the game hanger 512 and the game animal from the hoist 502. Preferably, second hook 516 includes an elongate guide rod 532 that extends downwards at an angle away from an end 534 of the second hook. As the game animal is lifted towards the horizontal bar 504, second hook connection 522 may be guided along guide rod 532 and over end 534 into engagement with second hook 516. The first hook 514 is then removed from the first hook connection 520 of the game hanger 518. In certain preferred embodiments, at least one of the first and second hook connections 520, 522 is formed as an enclosed loop without any breaks to ensure that the hook 514, 516 does not accidentally become disengaged from the corresponding hook connection. From the above description, it may be seen that the first and second hook connections 520, 522 are arranged such that the first hook 514 may be engaged with the first hook connection and, at the same time, the second hook 516 may be engaged with the second hook connection. To facilitate this simultaneous connection, the first hook connection 520 is preferably angled in either a forwards or backwards direction with respect to the second hook connection 522 (as shown best in FIG. 16). In certain cases, the first hook connection 520 is angled approximately 20° with respect to the second hook connection 522. However, greater or lesser degrees of angle may be provided between the first and second hook connections 520, 522.

After the game animal has been hung from the hoist 502, the apparatus 500 is converted to the skinning mode of operation in order to skin the animal. Referring again to FIGS. 13 and 14, the apparatus 500 includes a pulley 530 that is located vertically below the first hook 514. The apparatus 500 may be operated in the skinning mode of operation (FIG. 14) by passing the cable 510 around the pulley 530. In certain cases, the pulley 530 includes a removable bolt (not shown) that allows the cable to be passed around the pulley. The bolt is then placed back into the pulley 530 in order to secure the cable 510. When the apparatus 500 is operating in the skinning mode of operation, the first hook 514 is pulled towards the ground surface when the cable 510 is pulled. To skin the game animal, the first hook 514 (or another hook or other similar item connected to the cable 510 in place of or in addition to the first hook) is passed through a skin of the game animal. Thereafter, the winch 508 is activated and pulls the cable 510, which skins the animal by pulling the first hook 514 and the skin towards the ground surface.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. A coupling apparatus for connecting an accessory to a rear of an ATV, the coupling apparatus comprising:
   a first support member configured to connect to the rear of the ATV;
   a second support member configured to connect to the accessory;
   a coupling member configured to connect the first support member to the second support member; and
   a shock connected between the coupling member and the second support member.

2. The coupling apparatus of claim 1 wherein the first support member is pivotally connected to the coupling member and is configured to rotate about a first axis with respect to the coupling member.

3. The coupling apparatus of claim 1 wherein the coupling member comprises a tube section having a leading end configured to connect to the first support member and a trailing end configured to connect to the second support member.

4. The coupling apparatus of claim 3 wherein the coupling member further comprises a shock support arm extending upwards from the tube section, wherein the shock is configured to connect between the shock support arm and the second support member.

5. The coupling apparatus of claim 1 wherein the coupling member is connected to the second support member at a first mounting location and the shock is connected to the second support member at a second mounting location.

6. The coupling apparatus of claim 1 wherein the first and second support members engage the coupling member along a common horizontal axis.

7. A coupling apparatus for connecting an accessory to a rear of an ATV, the coupling apparatus comprising:
   a first support member configured to connect to the rear of the ATV;
   a second support member configured to connect to the accessory;
   a coupling member located between and also connecting together the first support member and the second support member, the coupling member having:
      a tube section having a first opening located at a leading end of the tube section and a second opening located at a trailing end of the tube section,
      wherein the first support member is configured to be slidably inserted into the first opening along an axis and the second support member is configured to be slidably inserted into the second opening along the axis; and wherein the first support member is removably and pivotally attached to the coupling member and the second support member is removably attached to the coupling member;
a shock connected between the coupling member and the second support member.

8. The coupling apparatus of claim 7 wherein the first support member is pivotally attached to the coupling member at a pivot location and is configured to pivot from a horizontal axis upwards relative to the horizontal axis or downwards relative to the horizontal axis.

9. The coupling apparatus of claim 8 wherein the first support member pivots upward or downwards up to 15 degrees.

10. The coupling apparatus of claim 7 wherein the second support member is pivotally attached to the coupling member at a pivot location and is configured to pivot from a horizontal axis upwards relative to the horizontal axis or downwards relative to the horizontal axis.

11. The coupling apparatus of claim 10 wherein the second support member pivots upward or downwards up to 15 degrees.

12. The coupling apparatus of claim 7 further comprising a shock support arm extending upwards from the tube section of the coupling member, wherein the shock is configured to connect between the shock support arm and the second support member.

13. The coupling apparatus of claim 12 wherein the shock extends downwards below a bottom surface the shock support arm and upwards above a top surface of the second support member.

14. The coupling apparatus of claim 7 wherein the second support member has a first end that connects to the trailing end of the tube section of the coupling member at a first vertical distance above a surface on which the coupling apparatus is located and wherein a second end of the second support member is configured to connect to the ATV at a second vertical distance above the surface on which the coupling apparatus is located that is different from the first vertical height.

15. The coupling apparatus of claim 14 wherein the first vertical distance is less than the second vertical distance.

* * * * *